June 5, 1928.  1,672,041

A. C. SCHMOHL ET AL

DUMP CAR BODY TILTING BEARING

Filed July 25, 1927  2 Sheets-Sheet 1

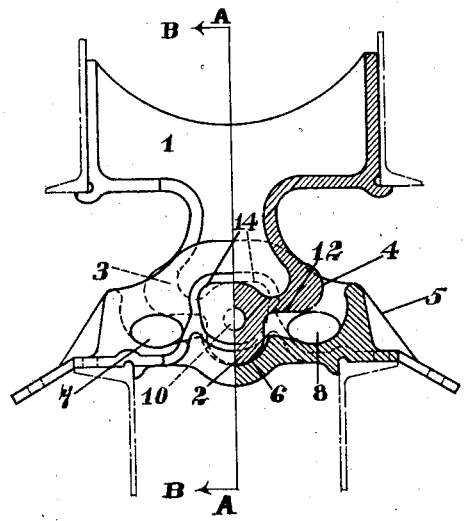
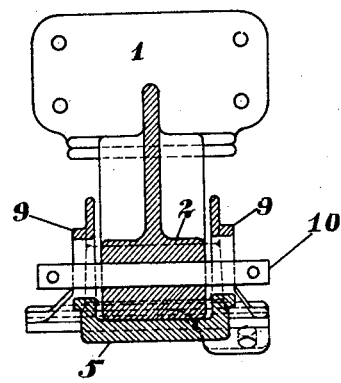
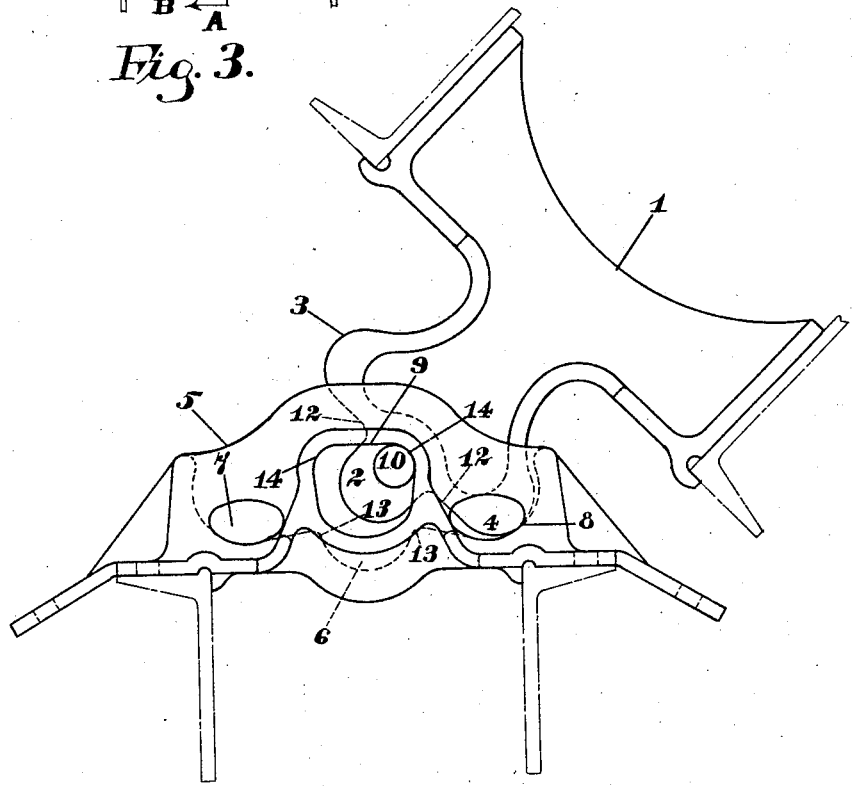

Patented June 5, 1928.

1,672,041

UNITED STATES PATENT OFFICE.

ALFRED C. SCHMOHL, OF BEAVER FALLS, AND JOHN P. ANDERSON, OF KOPPEL, PENNSYLVANIA, ASSIGNORS TO KOPPEL INDUSTRIAL CAR AND EQUIPMENT COMPANY, OF PITTSBURGH, PENNSYLVANIA, A CORPORATION OF PENNSYLVANIA.

DUMP-CAR-BODY TILTING BEARING.

Application filed July 25, 1927. Serial No. 208,173.

An object of the invention is to provide a dump car having the center of gravity of the body as low as possible, and yet be able to throw the body outward, in dumping, a sufficient amount to get the greatest possible discharge angle.

Another object of the invention is to provide a tilting bearing support for a dump car body which will enable the body to discharge its contents quickly and away from the car tracks.

Another object of the invention is to provide a dump car body with a tilting bearing support composed of two members having three points of possible contact and locking means between the members to retain said members in connected relation in all positions.

A further object of the invention is to provide a dump car body with body eccentric bearings which will assist the manual return of the tilted car body to a horizontal position after discharge of the contents.

Figure 1:
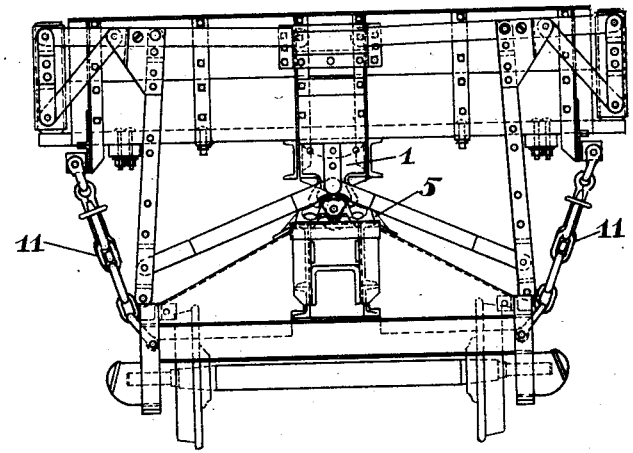
Figure 2:
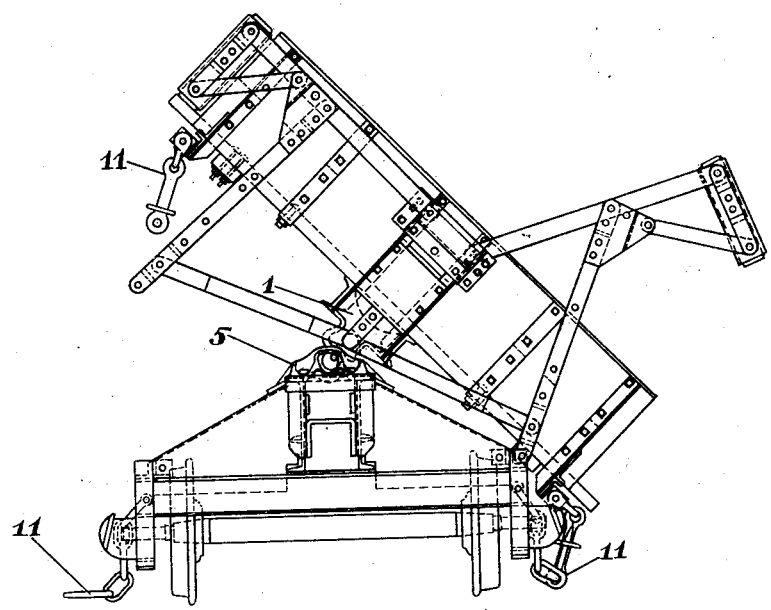

Referring now to the drawings, Fig. 1 is an end view of a dump car embodying the invention with the body in a horizontal position; Fig. 2 is an end view of the same car and shows the body tilted into a discharging position; Fig. 3 is an enlarged detail of the body tilting bearing in a normal position and shows half an end view and half section along the line A—A; Fig. 4 is a section of the Fig. 3 along the line B—B; Fig. 5 shows an enlarged detail, the body tilting bearing being tilted as in a discharging position.

Referring now in detail to the drawings, the reference character 1 indicates the upper portion or body member of the body tilting bearing with the central pivot 2 and eccentric pivots 3 and 4. The reference character 5 indicates the lower half or underframe member of the body tilting bearing with a central socket 6 and eccentric sockets 7 and 8. Cast integral with the member 5 are the lock engaging portions 9 which are adapted to engage the locking member 10 on the body member 1. These locking portions 9 in the member 5 are of necessity made in varying contours to suit the discharge angle assumed by the car body, it, of course, being understood that the bearing on one car will only lock at one predetermined dumping angle of the car body.

When the car is in position on the railroad tracks to discharge its contents the safety chains 11 are disconnected and the body is tilted. As the body is tilted it pivots about the member 2 in its socket 6 of the base member until the eccentric pivot on the tilting side engages its respective socket. This eccentric pivot then becomes the fulcrum point about which the car body is tilted until the maximum discharging angle is reached. During the time the body is tilting on the aforesaid eccentric bearing the pin 10 in the member 1 describes its course until it engages the surface 14, there locking the two members 1 and 5 against any further rotation.

The body after discharge of its contents will remain in tilted position as shown in Figs. 2 and 5 until manually returned. The fulcrum point, being eccentric for a part of the return movement of the body, reduces materially the effort required to return the body to its horizontal position.

Having thus described the invention what we claim as new and desire to secure by Letters Patent is:—

1. In a dump car, a two piece body tilting bearing comprising a three pivot body member supported in a base member having suitably disposed base sockets. the ends of which comprise a locking lip for receiving the upper member and integral locking surfaces engaging a projecting portion of the upper member.

2. In a dump car, a dump body tiltable about either side thereof on body supporting members comprising an upper member having central and eccentric pivots thereon adapted to bear in a base member having suitably disposed sockets to receive said pivots, said sockets for receiving eccentric pivots having lips thereon to engage said pivots when the body is in extreme dumping position, the socket to receive the central pivot having integral means to engage a locking pin in the central pivot to prevent separation of the upper and lower member during the dumping operation.

3. In a dump car, body supporting members adapted to tilt the body to either side thereof, central and eccentric pivots on the movable member bearing in suitably disposed sockets of a fixed base member, one of said eccentric pivots upon tilting of the car body becomes the fulcrum point to permit rapid and complete discharge of the contents of the body and, causing a sufficient part of the weight of the empty body to be to the rear of the fulcrum point to facilitate the return of the empty body to a horizontal position, removable locking means on one of the aforesaid members engaging integral means on the other of said members to prevent separation during any operative position.

In testimony whereof, we affix our signatures.

ALFRED C. SCHMOHL.
JOHN P. ANDERSON.